I. G. ANDERSON & H. A. McCOY.
LOCKING DEVICE FOR CENTER CONTROLLED LEVERS FOR SHIFT GEARS FOR AUTOMOBILES.
APPLICATION FILED SEPT. 29, 1917.

1,247,202. Patented Nov. 20, 1917.

Inventors
Thomas G. Anderson.
Henry A. McCoy.
By Fetherstonhaugh & co.
attys.

UNITED STATES PATENT OFFICE.

THOMAS GILBERT ANDERSON, OF ANCASTER, AND HENRY ALEXANDER McCOY, OF HAMILTON, ONTARIO, CANADA.

LOCKING DEVICE FOR CENTER-CONTROLLED LEVERS FOR SHIFT-GEARS FOR AUTOMOBILES.

1,247,292.   Specification of Letters Patent.   Patented Nov. 20, 1917.

Application filed September 29, 1917.   Serial No. 194,032.

*To all whom it may concern:*

Be it known that we, THOMAS GILBERT ANDERSON, of Ancaster, and HENRY ALEXANDER McCOY, of the city of Hamilton, both in the county of Wentworth, Province of Ontario, Dominion of Canada, have invented certain new and useful Improvements in Locking Devices for Center-Controlled Levers for Shift-Gears for Automobiles, of which the following is the specification.

Our invention relates to improvements in locking devices for center controlled levers for shift gears for automobiles and the object of the invention is to devise a simple form of locking device whereby this lever may be secured in the neutral position when the car is left standing so that the car cannot be operated and it consists of the following arrangement and construction of parts as hereinafter more particularly explained.

In the drawings like letters of reference indicate corresponding parts in the various figures.

Figure 1:
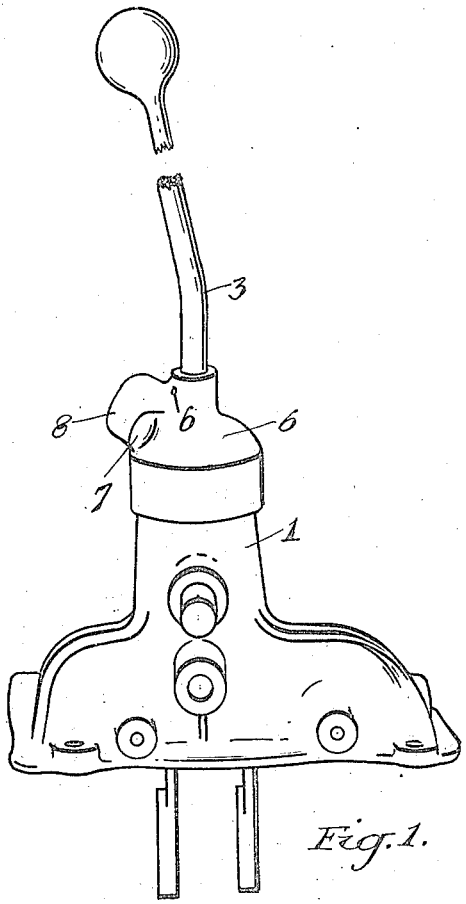
Figure 1 is a perspective view of a control lever and supporting bracket thereof showing our locking device connected thereto.
Figure 2:
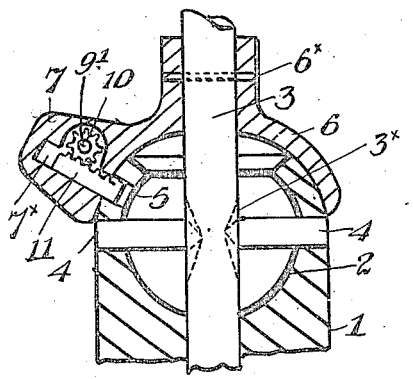
Fig. 2 is an enlarged sectional detail through the socket in which the lever is supported and showing our locking device.
Figure 3:
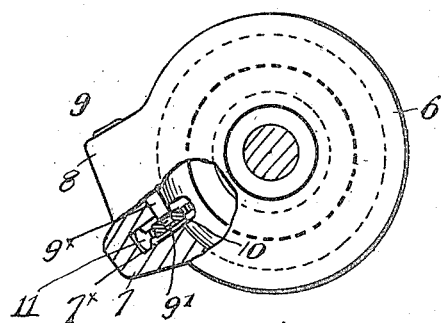
Fig. 3 is a plan view showing the cap partially broken away to exhibit our lock bolt and operating device therefor.

1 indicates the main supporting bracket, which is provided at its upper end with a socket 2 in which is supported a lever 3 provided with bearing recesses 3×. 4 indicates bearing pins provided with pointed ends fitting into the bearing recesses so as to provide for a ball rocking action of the lever 3. 5 indicates a hole, which is made in the wall of the socket 2 and directed radially to the center of such socket or radially to the center of swing of the lever 3.

The upper end of the socket support 1 is convex. Upon the convex upper end of the support rests an inverted cap or cup 6 provided with a boss 7 having a longitudinal recess 7× therein which is brought into alinement with the hole 5 when the lever 3 is in the neutral position.

8 indicates a boss also formed integral with the cap 6 and extending at right angles to the boss 7 and in which is located a suitable form of key operated lock such as a pin lock 9, which is provided with a barrel 9× which forms part of this type of lock. The inner end of the barrel 9× is provided with a reduced threaded end 9′.

10 indicates a pinion, which is secured upon the threaded end 9′ of the barrel 9× and 11 indicates a rack bolt which fits in the recess 7×, the rack of such bolt meshing with the pinion 10. The cap 6 is secured to the lever by a cross pin 6×.

It will thus be seen that when the lever 3 is swung to the neutral position that by inserting a key in the lock 9 the barrel 9× thereof is rotated turning the pinion 10 and thereby carrying the bolt 11 inwardly or outwardly into or out of engagement with the opening 5 thereby locking or unlocking the lever 3 as desired.

It will be noticed that the bolt 11 is locked in a radial position to the center of swing of the lever and therefore, absolutely prevents any upward movement of such lever.

What we claim as our invention is:

For use as an accessory to a gear shift lever having a ball carried thereby and a hemispherical socket element for the ball forming a part of the gear cover; comprising a cup shaped dust cap attachable to the gear shift lever having a stem encircling the lever, a boss on the member extending radially therefrom, a further boss extending at right angles to the first mentioned boss, said bosses having communicating passageways therein, means carried by the cap for locking it directly to the socket element comprising a locking bolt housed in the passageway of one boss, and a locking barrel including a key-way co-acting with the bolt means in the passageway in the other boss.

THOMAS GILBERT ANDERSON.
HENRY ALEXANDER McCOY.

Witnesses:
   GERTRUDE NICHOLSON,
   J. W. G. MITCHELL.